Sept. 10, 1968  O. W. FRYLING  3,400,441
METHOD OF MAKING SPLIT-WEDGE GATE VALVES
Filed Aug. 28, 1964
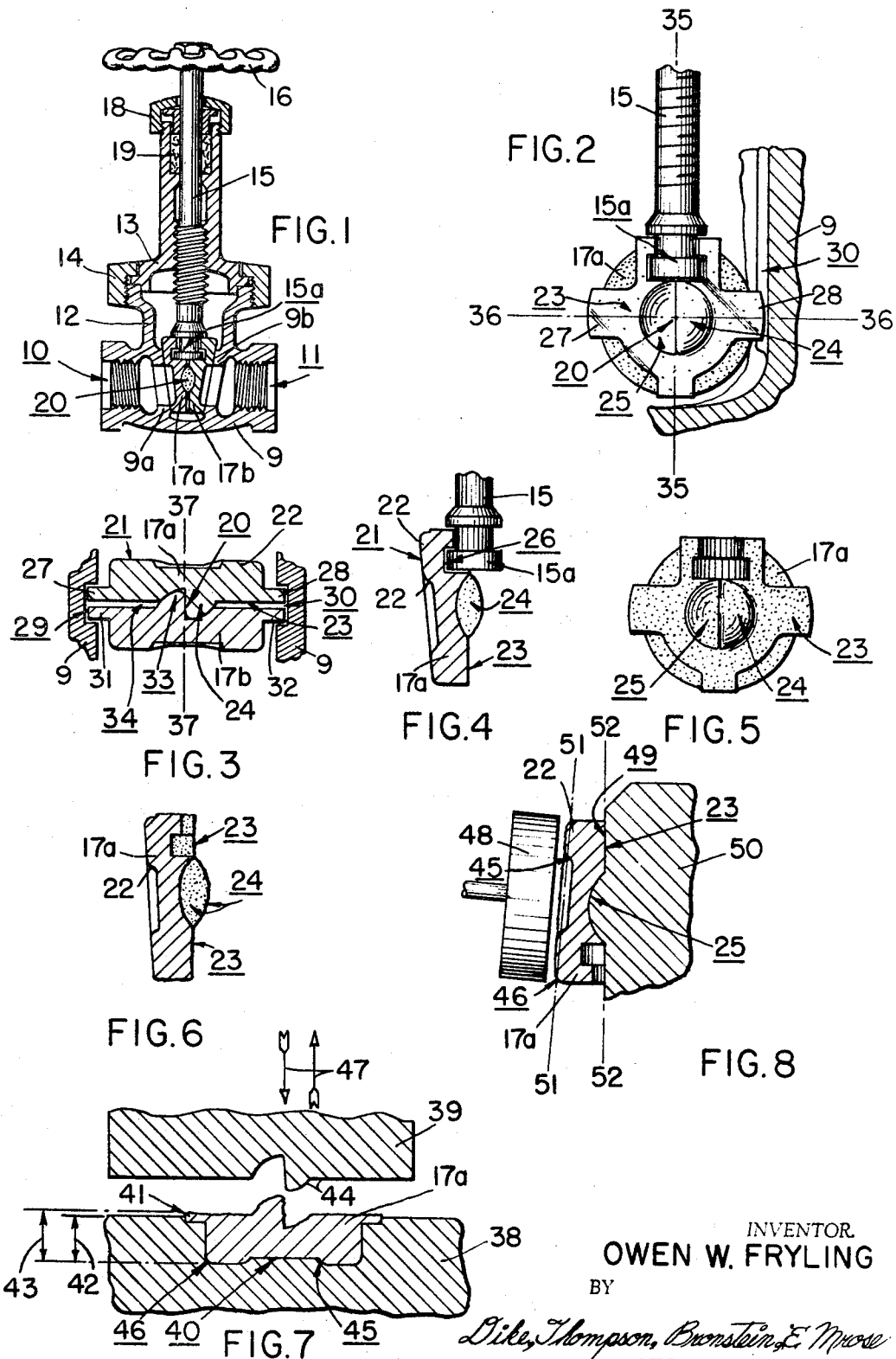
INVENTOR.
OWEN W. FRYLING
BY
Dike, Thompson, Bronstein & Mrose
ATTORNEYS

United States Patent Office 3,400,441
Patented Sept. 10, 1968

3,400,441
METHOD OF MAKING SPLIT-WEDGE GATE VALVES
Owen W. Fryling, North Scituate, Mass., assignor to Walworth Company, New York, N.Y., a corporation of Massachusetts
Filed Aug. 28, 1964, Ser. No. 392,883
10 Claims. (Cl. 29—157.1)

The present invention relates to improvement of gate valves of the split-wedge type, and, in one particular aspect, to novel and improved practices for the economical manufacture of interchangeable valve gate wedges which have precisely gaged and hardened surfaces, and which cooperate uniquely with other elements of a gate valve structure to promote improved valve-seating actions.

Both single-piece and two-part or split wedges have for many years been exploited as the slidable valving members of gate valves; generally the wedging angle in such devices is selected as a relatively small acute angle, and cooperating surfaces of the wedge member and body seat must therefore be held to very fine dimensional tolerances to develop tight sealing and to insure that the wedge seats neither too high nor too low within the valve body. The small wedge angles are preferred, nevertheless, because they effect a desirable multiplication of stem thrust which enables tight sealing with relatively low applied stem torques, and because the resulting frictional locking between seated surfaces aids in preserving full closure once it has been effected. Manufacture of closely-dimensioned single piece wedge members is found to present numerous difficulties, and, further, such single-piece members may fail to seat precisely in the event the cooperating body seats become distorted by strains imposed by associated piping or the like. Accordingly, the two-part or split wedge construction is often preferred, particularly inasmuch as the two split halves have limited freedom for independent relative movements which permit them to adjust themselves into good seating against their respective body seats.

The aforesaid freedom for independent relative movements between the back-to-back halves of a split wedge should be of a substantially "universal" type, such as that afforded by a ball-and-socket joint, and these results have been obtained in the past by forming a hemispherical (male) projection on the back surface of one half of the wedge and a mating hemispherical (female) recess in the back of the other cooperating half of the composite wedge member. For purposes of enabling construction of both wedge halves in identical form, it has also been proposed that each have both male and female characteristics (i.e., a side-by side projection and recess in each half) which develop the desired ball-and-socket action when the two parts are mated. Casting techniques have been employed in the manufacture of such wedge members for two principal reasons: first, many of the metals from which castings can readily be made have the corrosion-resistance required in valving operations, whereas, for example, many forgings do not; and, second, the spherically-shaped surfaces which provide for universal movements cannot be machined easily and at low cost. However, conventional inexpensive castings exhibit surface irregularities which prove to be particularly troublesome at the sites of the mated spherically-shaped surfaces. These mated surfaces will provide adequately for the intended universal movements, but their irregularities tend to wear quickly and thereby alter the critical spacings between the machined seating surfaces on the opposite faces of the paired split wedge halves. Moreover, the differences in surface irregularities of the cast wedge halves make it imperative that they be paired during machining of their seating surfaces and that they then be stocked and preserved for use as matched pairs, such that, unfortunately, little interchangeability can be realized.

Accordingly, it is one of the objects of the present invention to provide novel and improved split-wedge gate castings which are rendered interchangeable and preserve highly precise dimensional characteristicss.

Another object is to provide precision split-wedge gate members which lend themselves to economical manufacture individually from castings and which possess hardened wear-resistant mating surfaces.

A further object is to provide novel and improved split-wedge gate valves wherein "hermaphrodite" pairs of wedges of identical simple configuration are fully interchangeable and preserve predetermined wedge dimensions and seating characteristics.

It is also an object to provide a unique and highly advantageous method for the manufacture of interchangeable wear-resistant split-wedge gate members having precisely gaged pivoting and seating surfaces.

Still further, it is an object to provide a novel method for the individual manufacture of accurately-matched split-wedge valve gate members from inexpensive castings which are coined to produce precise locating and bearing surfaces.

By way of a summary account of practice of this invention in one of its aspects, the two halves of a slidable split-wedge gate valve member are formed from generally similar non-ferrous castings, such as bronze, which exhibit the customary surface irregularities of their molds. These halves are each of a "hermaphrodite" configuration which on one side includes an outwardly-extending projection alongside an inwardly-extending recess, both the projection and recess being shaped as somewhat less than half a spherical segment so that the two halves may be joined thereby for limited ball-and-socket type relative movements. The sides which display the socketing projections and recesses are substantially planar over substantially the balance thereof, and each of the opposite sides exhibit the conventional annular raised rim which is to be machined at a predetermined angle of inclination to form an annular seating face for the composite wedge. Laterally-extending ears are also provided for guidance of the composite wedge in body channels during its sliding movements to and from closure. Each casting is then placed within a die recess of about the same complementary shape, with a small amount of the casting projecting from the recess, and a coining die is suddenly brought to bear on the exposed side of the casting under great pressure to cause the mating exterior surfaces for the socketing, and the surrounding substantially planar surfaces, to be coined into a predetermined relationship with most of the irregularities smoothed out. The coined planar surface is then taken as a reference plane for machining of the annular inclined seating surface on the opposite side, this being facilitated by affixing the planar surface in abutting relationship to a fixture surface while machining is performed down to a predetermined relationship. Each split-wedge half produced in this manner is found to display highly precise prescribed dimensions between its seating surfaces and surfaces of its socketing provisions, and the socketing surfaces are hardened and durable. Dimensional precision of the independently-formed halves permits their use interchangeably.

Although the aspects of this invention which are believed to be novel are expressed in the appended claims, additional details as to preferred practices and embodiments, and as to the further advantages, objects and features thereof may be most readily comprehended through reference to the following description taken in connection with the accompanying drawings, wherein:

FIGURE 1 is a cross-sectioned illustration of a typical gate valve construction with which the present invention may be practiced;

FIGURE 2 portrays half of an improved split-wedge gate member in association with portions of a valve stem and a valve body;

FIGURE 3 is a horizontal cross-section of mated split-wedge members;

FIGURE 4 is a vertical cross-section of a split-wedge member, together with a portion of a valve stem;

FIGURE 5 depicts one split-wedge member, as viewed from the mating side;

FIGURE 6 is a vertical cross-section of a split-wedge member in the as-cast state;

FIGURE 7 provides a cross-section of coining die members in association with a split-wedge member; and FIGURE 8 illustrates a facing tool in association with a cross-sectioned portion of a fixture supporting a coined split-wedge member for accurate machining of seating surfaces.

The gate valve assembly appearing in FIGURE 1 is of a generally standard type including a cast bronze body 9 having aligned threaded pipe openings 10 and 11 and an upstanding body portion 12 to which a bonnet 13 is separably clamped by a nut 14. A threaded stem 15 is raised and lowered within the bonnet and valve body as the handle 16 is turned, thereby causing the split-wedge halves 17a and 17b of a composite wedging member to be raised from and forced downwardly into seated relationships with the annular seating surfaces on the integral seating portions 9a and 9b of the valve body. Stuffing nut 18 compresses a packing 19 within the bonnet into sealing relationship with the rotatable stem. In alternative constructions, such known features as threaded-in, threaded-over or bolted bonnets, separate inserted seat members, stem and bonnet seals, and the like, may be utilized.

Wedge halves 17a and 17b are mated together at site 20 by a special form of socketing arrangement described in greater detail later herein, and are in a conventional entrapping relationship to the lower end 15a of the valve stem which is shaped to promote the entrapment. The composite wedge is held together at least loosely in other positions by laterally-extending integral tabs or ears which project from the split wedge halves into narrow vertical channels in the valve body. An acute taper angle of about 10° appears between the inclined machined seats on the annular seating portions 9a and 9b of the valve body, and the same taper angle is reproduced by the opposite machined faces of the split wedge. Downward thrusts of the stem are thereby multiplied to achieve tight sealing, and the friction developed between seating surfaces tends to hold the composite gate in place without lateral slippage.

Both of the split-wedge halves 17a and 17b are of identical configuration, and any one of such elements may be substituted for another. As is evident from the illustrations in FIGURES 2–4, each split-wedge elements (such as element 17a) is of an especially simple contour, in that the outer side or face has merely an annular machined seating surface 21 on a annular rim 22, and the inner side or back has a planar surface 23 with a substantially central projection 24 and recess 25; the usual T-shaped recess 26 for the T-shaped end 15a of the stem is also provided near the top of the inner side. Laterally-extending integral tabs or ears 27 and 28, which are of a predetermined width narrower than the split-wedge element, and which have their inner sides in the same plane as the back planar surface 23, are designed to project into and be guided by vertical body slots or channels 29 and 30 (FIGURES 2 and 3). The ears 27 and 28 are disposed near the oppositely-extending ears 31 and 32, respectively, of split-wedge element 17b when the two are placed back-to-back (FIGURE 3), and the paired ears are guided somewhat loosely in the channels 29 and 30 to prevent the split wedges from separating while raised above the body seats and, at the same time, permitting the split wedges to have ample room for such limited rotations about the stem axis as are necessary to insure optimum seating of the split wedges with the body seats. FIGURE 3 makes it clear that the projecting (male) portions 24 and 33 of split wedges 17a and 17b extend outwardly beyond the planar back surfaces to a greater extent than the recesses, such as recess (female) portion 25, are sunk into the split wedges, whereby the planar back-to-back surfaces of the fully-mated wedges are always separated by space, 34, sufficient to permit the required relative pivotal movements of the split wedges both about the stem axis 35—35 (FIGURE 2) and an axis 36—36 (FIGURE 2) transverse thereto. Each of the projections 24 and 33 is preferably of volume slightly less than half of a substantially spherical segment (i.e., somewhat less than the maximum volume of a spherical quadrant), and each of the adjoining side-by-side recesses, such as recess 25, is of volume which is yet slightly smaller than that of the companion projection; when fully mated, the abutting spherically-contoured surfaces of the split wedges promote ball-and-socket or universal type relative movements. The plane of separation 37—37 (FIGURE 3) between the side-by-side projection and recess in each instance is coincident with the vertical stem axis, and transverse to the planar back surface. As the split wedge halves are pressed together upon being wedged between the body seats, the projections engage the surfaces of the recesses and force the halves into full lateral engagement along the plane 37—37, thereby preventing lateral slippage and also preventing these halves from locking together at anything other than a predetermined relative lateral orientation. In the latter connection, a precise repeatable seating is thus assured, and the composite wedge gate always has the same relative orientations of its tapered machined seating surfaces, so that the gate cannot seat too high or too low in the body.

The bronze split-wedge element 17a shown in FIGURES 5 and 6 is in a generally rough condition such as the condition as cast, or roughly forged, for example, exhibiting surface irregularities which are characteristic of the casting mold surfaces or of other rough forming. In particular, the irregularities appearing on the surfaces of universal-jointing projection 24 and recess 25 are highly troublesome (the irregularities being somewhat exaggerated in FIGURE 6 as an aid to understanding). It is found that these irregularities cannot be machined away conveniently, because of the types and locations of spherical contouring involved, and moreover, they are relatively small and soft and can be quite easily worn in use. These irregularities tend to make the dimensions of the composite wedge gate unpredictable, from one assembly to the next, and, further, the wear results in changed dimensions in use such that the gate may not continue to seat at the same height. Some improvement in accuracy of the initial gaging dimensions of a composite wedge may be realized by pairing the split halves for machining of their outer annular seating surfaces, but this does not overcome the problems associated with wear, and it involves matched pairs which must always be stocked, sold and used together. In overcoming certain of these difficulties, the use of a substantially planar back surface for each split wedge element is brought into focus. This surface is provided as a reference for purposes of accurate machining of the annular seating surfaces on the outer faces of the split wedge elements. As shown, the foundation for planar surface 23 (FIGURES 2–4) is of a substantially cruciform raised configuration, such that each split wedge element need not be excessively heavy and wasteful of material, although in other designs it may extend fully across the back or, instead, across other raised patterns or ribbing.

The desired precise reference plane, corresponding to planar surface 23, and related precision forming of the male and female socketing surfaces, are established by a coining operation performed before the seating surface is machined. FIGURE 7 explains this, illustrating the use of a female die member 38 and a cooperating male die member 39. The cavity 40 which is provided in die member 38 is proportioned to accommodate a split wedge element, such as element 17a, from its outer or face side, with just a small amount 41 of the element projecting above the cavity; depth dimensions 42 of the cavity are just short of the initial depth dimensions 43 of the surface 23 of the as-cast wedge element. Cooperating die member 39 has lower surfaces 44 which precisely match those desired for the back surfaces 23–25 of the wedge element, and, when the dies are forced together, the surfaces 23–25 are precisely coined onto the element. At the same time, the annular raised rim 22 on the face of element 17a has its corners rounded or chamfered accurately on the inner and outer peripheries 45 and 46, respectively. A single massive pressing, such as that produced by a hundred-ton crank-operated press, may suffice in a typical coining operation. Arrows 47 designate the directions of relative movements between the die members. It is found after coining that the coined element has predetermined dimensions between its sides, and that surface 23 is substantially planar, and that the socketing surfaces 24 and 25 are not only of precise dimensions but are relatively smooth and dense and hard. Small remaining irregularities are concave only, and do not have adverse effects; the "worked" metal at the surfaces of interest proves to be highly durable and resists wear to distinct advantage.

The coined elements are subsequently machined to provide annular seating surfaces, on the outer sides, which are both of a substantially predetermined area and are precisely related to the reference surface 23, and, hence, to the socketing surfaces 24 and 25 also. The machining, performed by a conventional type of rotating abrasive or cutting tool 48 (FIGURE 8), is performed while each coined element has its substantially planar reference surface 23 abutted with a reference surface 49 of a suitable fixture 50. Clamps or other known forms of holding elements (not shown) keep the wedge element in place upon the fixture, as does also the mating of socketing surfaces 24 and 25 with surfaces of complementary shape on the fixture 50. The plane 51—51 to which the rim 22 is cut by the associated automatic machinery, of known type, is precisely related to the plane 52—52 of the reference planar surface 23, in each case, and the machined elements are therefore fully interchangeable thereafter and need not be either machined or matched in pairs. Further, the coined chamfers 45 and 46 insure that no machining burrs will result, and, even more significantly, that the annular seating surface area of each wedge element will be the same as every other such surface.

It should be understood that the embodiments and practices described and portrayed have been presented by way of disclosure rather than limitation, and that various modifications, substitutions and combinations may be effected without departure from the spirit and scope of this invention in its broader aspects.

What I claim as new and desire to secure by Letters Patent of the United States is:

1. The method of manufacturing split-wedge gate valve apparatus which comprises roughly forming a plurality of split-wedge metal gate valve elements each with a ball-and-socket type mating connection surface on one side thereof merged with a relatively broad-area reference surface, both of which surfaces are substantially irregular in the rough-formed condition, subjecting each of said elements to pressures of coining die members sufficient to coin said irregular surfaces into relatively smooth and hard surfaces which, except for any relatively minor depressions remaining therein, are in a precision relationship to one another established by action of the coining die members, and thereafter machining a seating surface on the other side of each of said elements with reference to the coined broad-area reference surface thereof.

2. The method of manufacturing split-wedge gate valve apparatus which comprises casting a plurality of split-wedge metal gate valve elements each with a ball-and-socket type mating connection surface on one side thereof merged with a substantially planar reference surface, both of which surfaces are substantially irregular in the as-cast condition, subjecting each of said elements to pressures of coining die members sufficient to coin said irregular surfaces into relatively smooth and hard surfaces which, except for any relatively minor depressions remaining therein, are in a precision relationship to one another established by action of the coining die members, affixing each of the coined gate valve elements to a fixture with the coined substantially planar reference surface thereof in abutting relationship to a substantially planar reference surface of the fixture, and machining a seating surface on the other side of each of said elements in a predetermined tapered relationship to said coined substantially planar surface thereof, whereby each of said elements has predetermined gage relationships between its machined seating surface and hard connection surfaces on the opposite sides thereof.

3. The method of manufacturing split-wedge gate valve apparatus which comprises casting a plurality of split-wedge metal gate valve elements each with a raised annular rim on one side thereof and with a ball-and-socket type mating connection surface on the other side thereof merged with a substantially planar reference surface, both of which surfaces and the surfaces of said rim are substantially irregular in the as-cast condition, subjecting each of said elements to pressures of coining die members sufficient to coin said irregular surfaces into relatively smooth, dense and hard surfaces of predetermined shape and which, except for any relatively minor depressions remaining therein, are in a precision relationship to one another established by action of the coining die members, said annular rim surfaces also being chamfered to a precision shape about the inner and outer peripheries by action of the coining die members, affixing each of the coined gate valve elements to a fixture with the coined substantially planar reference surface thereof in abutting relationship to a substantially planar reference surface of the fixture and with the mating connection surface thereof in mated relationship with a connection surface of complementary shape on the fixture, and machining an annular and planar seating surface on the annular rim of each of said elements in a predetermined relationship to said coined substantially planar reference surface thereof, whereby each of said elements has predetermined gage relationships between its seating surface and hard connection surface and whereby the annular seating surface is of a predetermined area.

4. The method of manufacturing split-wedge gate valve apparatus which comprises roughly forming a plurality of identical split-wedge metal gate valve elements each with ball-and-socket type mating connection surfaces substantially centrally on one side thereof formed by a side-by-side spherically-surfaced projection and spherically-surfaced recess, said projection being in the shape of but of volume no larger than that of a spherical quadrant and said recess being of the same curvature but lesser height than said projection, and said connection surfaces being merged with a substantially planar reference surface, both said reference and connection surfaces being substantially irregular in the roughly-formed condition, subjecting said surfaces of each of said elements to pressures of coining die members sufficient to coin said irregular surfaces into relatively smooth, dense and hard surfaces which, except for relatively minor depressions remaining therein, are in a precision relationship to one another established by action of the coining die members, and thereafter machining a seating surface on the other side of each of said elements with reference to the coined substantially planar surface, whereby the split-wedge elements are dimensionally substantially identical with one another.

5. The method of manufacturing split-wedge gate valve apparatus as set forth in claim 4 wherein the step of roughly forming said elements comprises casting said elements, wherein said machining includes affixing each of the coined gate valve elements to a fixture with the coined substantially planar reference surface thereof in abutting relationship to a substantially planar reference surface of the fixture and with the connection surface thereof in mated relationship with a connection surface of complementary shape on the fixture, and machining said seating surface while the element is affixed to the fixture.

6. The method of manufacturing split-wedge gate valve apparatus as set forth in claim 5 which comprises casting each of said elements with a pair of integral oppositely-extending guide tabs which on one side are substantially coplanar with said substantially planar reference surface, said tabs serving to guide said elements for sliding movements within oppositely-disposed channels in a valve body, whereby said guide tabs do not obstruct the affixing of said elements to the fixture for said machining.

7. The method of manufacturing split-wedge gate valve apparatus as set forth in claim 6 wherein each of said elements is cast with a substantially T-shaped recess in said one side thereof to receive substantially half of the substantially T-shaped end of a valve stem member, and wherein said projection and recess on said one side of each of said elements are both of lesser volume than that of a spherical quadrant of the same spherical contour.

8. The method of manufacturing split-wedge gate valve apparatus as set forth in claim 7 wherein each of said elements is cast with a substantially planar surface extending between and connecting the adjacent surfaces of said projection and recess and extending substantially perpendicularly to said substantially planar reference surface and substantially in alignment with the axis of the stem member.

9. The method of manufacturing split-wedge gate valve apparatus as set forth in claim 8 wherein each of said elements is cast with said tabs extending in opposite directions therefrom and substantially perpendicularly to said substantially planar surface connecting said projection and recess.

10. The method of manufacturing split-wedge gate valve apparatus as set forth in claim 9 wherein each of said elements is cast with said substantially planar reference surface on a raised portion of said element which is of substantially cruciform configuration, two of the opposite arms of said cruciform raised portion including said tabs.

References Cited
UNITED STATES PATENTS

| | | | |
|---|---|---|---|
| 3,118,197 | 1/1964 | Yates | 29—157.1 |
| 1,965,670 | 7/1934 | Schaver. | |
| 2,239,271 | 4/1941 | Olson | 251—195 |
| 2,309,666 | 2/1943 | Parker | 29—157.1 X |
| 2,359,442 | 10/1944 | Sandilands | 29—157.1 |
| 3,149,818 | 9/1964 | Siepmann | 29—157.1 X |
| 3,215,399 | 10/1965 | McInerney | 251—195 |

CHARLIE T. MOON, *Primary Examiner.*

J. CLINE, *Assistant Examiner.*